(12) United States Patent
Anderson

(10) Patent No.: US 6,279,250 B1
(45) Date of Patent: Aug. 28, 2001

(54) APPARATUS FOR ENHANCED SOLVENT RECOVERY FROM SOLVENT EXTRACTED MATERIAL

(75) Inventor: George E. Anderson, Champlin, MN (US)

(73) Assignee: Crown Iron Works Company, Minneapolis, MN (US)

( * ) Notice: Subject to any disclaimer, the term of this patent is extended or adjusted under 35 U.S.C. 154(b) by 0 days.

(21) Appl. No.: 09/391,333

(22) Filed: Sep. 7, 1999

(51) Int. Cl.[7] .............................. F26B 19/00; F26B 13/10; F26B 21/06; F26B 17/12
(52) U.S. Cl. .............................. 34/526; 34/527; 34/573; 34/549; 34/535; 34/164; 34/165; 34/168; 34/171; 34/90; 34/92
(58) Field of Search .............................. 34/526, 527, 573, 34/549, 535, 164, 165, 168, 171, 90, 92

(56) References Cited

U.S. PATENT DOCUMENTS

| | | | |
|---|---|---|---|
| 2,806,297 | 9/1957 | Hutchins | 34/173 |
| 3,018,564 | 1/1962 | Kruse et al. | 34/173 |
| 3,359,644 | 12/1967 | Goldman | 34/58 |
| 3,942,960 | * 3/1976 | Girard . | |
| 4,153,787 | * 5/1979 | Cheape, Jr. et al. . | |
| 4,332,092 | 6/1982 | Hansotte | 34/27 |
| 4,422,901 | * 12/1983 | Karnofsky . | |
| 4,635,380 | * 1/1987 | Anderson . | |
| 5,620,728 | * 4/1997 | Langley et al. . | |
| 5,727,689 | * 3/1998 | Anderson et al. . | |
| 5,884,769 | * 3/1999 | Anderson . | |

\* cited by examiner

Primary Examiner—Anthony J. Weier
(74) Attorney, Agent, or Firm—Nawrocki, Rooney & Sivertson, P.A.

(57) ABSTRACT

Apparatus and method for desolventizing particulate material having a solvent carried thereby wherein an upper indirect heating zone and a lower direct heating zone is provided. Each of the zones has a plurality of spaced apart horizontal trays for receiving particulate material. The trays define a vertical series of compartments through which the particulate material passes. Steam is provided to the particulate material indirectly in said indirect heating zone and directly in said direct heating zone are also included. An integral air tight flash chamber below the compartments enhances solvent recovery via vaporization of residual solvent from the condensed steam adhered to the particulate material traveling through the direct heating zone prior to discharge of the particulate material. The recovered residual solvent is delivered under pressure to a predetermined compartment in the direct heating zone provide heat for desolventizing the solvent-laden particulate material.

7 Claims, 1 Drawing Sheet

APPARATUS FOR ENHANCED SOLVENT RECOVERY FROM SOLVENT EXTRACTED MATERIAL

TECHNICAL FIELD

This invention relates to a material treating apparatus and method, and more particularly to an apparatus and method for heat treating a solvent extracted oleaginous material for enhanced recovery of solvent and steam used in the heat treating process. The apparatus and method are also applicable to the thermal treatment of other materials and to materials containing liquids adhering thereon.

BACKGROUND OF INVENTION

In the processing of oleaginous seeds to extract oil by solvent extraction, the seeds are crushed, milled or otherwise fragmented (i.e., made into cakes, flakes etc.) and are treated with a solvent to extract the oil, leaving a solvent extracted material (i.e., a particulate material, e.g., a meal) in which vaporizable solvent remains. By heating the meal using steam both indirectly as by a heated surface and/or directly by intimate steam contact with the meal, the solvent is removed therefrom by vaporization while the "wet" meal is dried and otherwise processed to deactivate certain types of enzymes and to denature proteins to thereby produce an edible substance.

The prior art generally discloses processes and apparatus wherein the material from which the solvent is to be removed progresses downwardly as a bed through a column which is provided with spaced horizontal plates therein dividing the interior of the column into a vertical series of compartments. In these compartments, the material is heated and agitated, with the finished material discharged from the bottom of the column and the solvent being removed as an overhead vapor from the column for subsequent condensing, with or without pre-conditioning or treatment.

Present desolventizing practice includes counter-current processing using a direct contacting flow of steam. Steam is distributed within the column such that it condenses on the particulate material while vaporizing some quantity of solvent adhered thereupon, further providing sensible heat to raise the temperature of the particulate material.

Generally, the moisture content of the particulate material exiting the desolventizer is from about 15 to 25 weight percent and is a function of prior solvent content, other moisture content, the ratio of direct steam to indirect steam used in the process, and the exit temperature. Drying is generally required to produce commercially saleable meal, with moisture reduction on the order of 25 to 33 percent being necessary so as to produce a commercial product having a moisture content of about 10–12 weight percent.

A shortcoming of known desolventizing practice is a small but significant quantity of the moisture content needing to be removed from the meal exiting the desolventizer is solvent. Customarily, a portion of the residual solvent remaining with the meal after desolventizing is driven off (i.e., vaporized) in subsequent drying steps, along with the condensed steam adhered or carried by the meal exiting the desolventizer.

Heretofore, no known desolventizing process or single apparatus has satisfactorily minimized atmospheric solvent vapor discharge, reduced the quantities of make-up to the recycle solvent stream and reduced the capital and operating costs of desolventizing operations as contemplated by the apparatus and process of this invention.

SUMMARY OF THE INVENTION

It is a first objective of the invention to provide an improved apparatus and method for desolventizing a particulate material.

Another objective of the invention is to provide an improved apparatus and method for desolventizing a particulate material whereby solvents are substantially vaporized in an indirect heating zone and further vaporized in a direct heating zone.

Another objective of the invention is to provide an improved apparatus and method for enhanced solvent vapor recovery from a particulate material having a solvent carried thereby, whereby particulate material in a direct heating zone enters an integral air tight flash chamber positioned below a live steam sparge tray prior to discharge of the "wet" solvent extracted material from the desolventizer.

Another objective of the invention is to provide an improved apparatus and method for more efficiently heat treating a solvent extracted material to remove the solvent adhered thereto whereby residual solvent vapor obtained in a flash chamber integral to a desolventizer is thermocompressed for entry into a direct heating zone.

According to a preferred embodiment of the present invention and in furtherance of aforementioned objectives, apparatus and method is provided having an upper indirect heating zone and a lower direct heating zone. Each of the zones has a plurality of spaced apart horizontal trays for receiving particulate material. The trays of the indirect heating zone permit flow of solvent vapor theraround while the trays of the direct heating zone allow a counter-current flow of solvent vapor and steam therethrough. The trays define a vertical series of compartments through which particulate material passes. Separate means for providing steam to the particulate material indirectly in said indirect heating zone and directly in said direct heating zone are provided. An integral air tight flash chamber below the means for providing steam heat to the particulate material directly in said direct heating zone enhances solvent recovery via vaporization of residual solvent from the condensed steam adhered to the particulate material traveling through the direct heating zone prior to discharge of the particulate material for subsequent processing. Means for delivering the vaporized residual solvent under pressure to a predetermined compartment in the direct heating zone provide heat for desolventizing the particulate material.

DETAILED DESCRIPTION OF THE INVENTION

Figure 1:
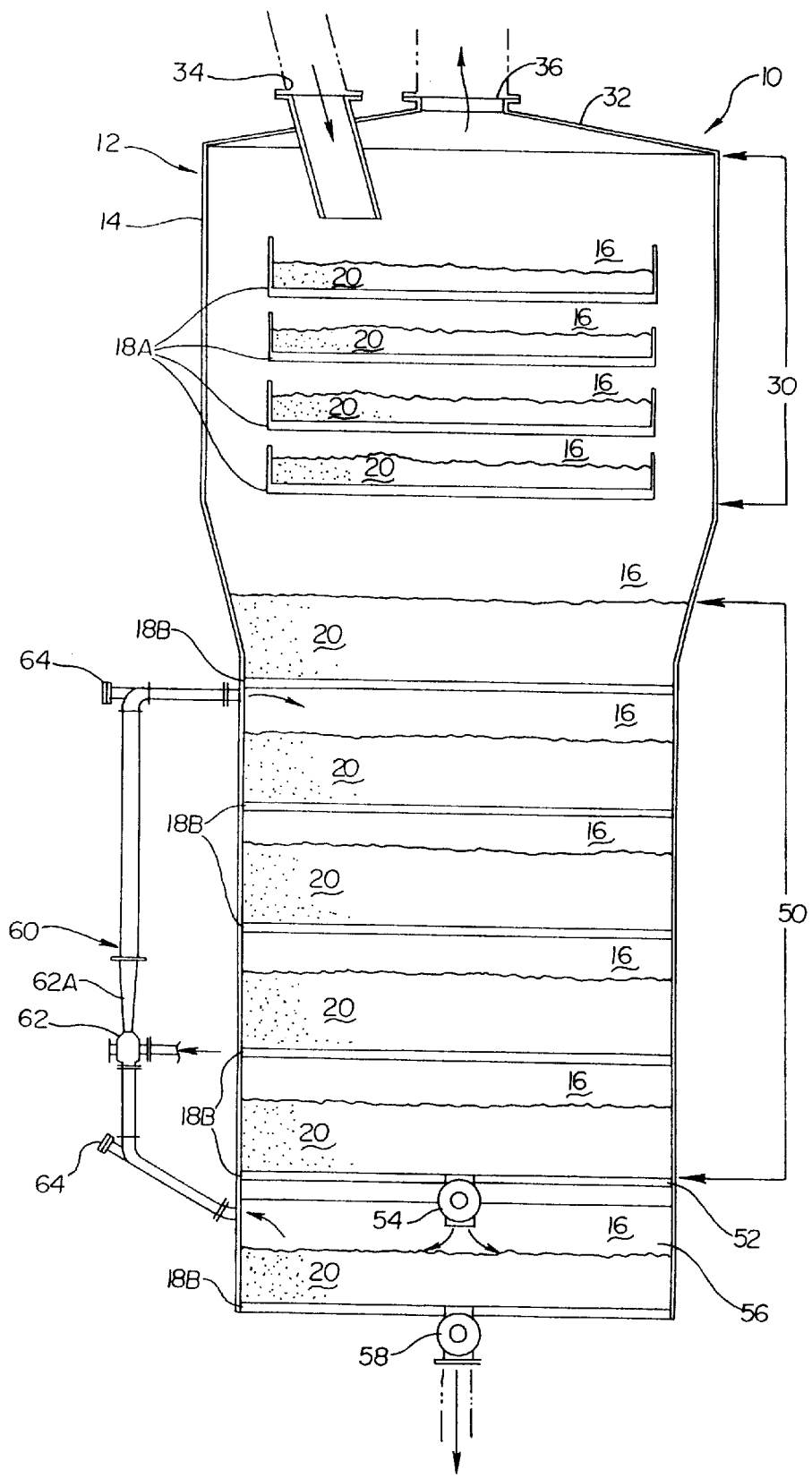
FIG. 1 is a schematic cross section of a desolventizing apparatus constructed in accordance with this invention.

Referring now to FIG. 1, there is shown a desolventizing apparatus 10 having a hollow, generally cylindrically shaped housing 12 which forms a vertical column 14 divided horizontally into a vertical series of compartments 16 by trays 18 for cascadingly carrying solvent laden material 20. Each of the trays 18 has an opening through which the particulate material 20 is passed downwardly (i.e., cascaded) from one compartment to the next compartment in a controlled manner. The column 14 is further equipped with agitation means (not shown) to maintain the particulate material occupying each tray in adequate mixing motion, keep the particulate material in a loose (i.e., non-agglomerated and substantially homogenous) condition, and ultimately move the particulate material in a thin layer towards the tray outlets. Agitators or sweep arms which move over the bottoms of the compartments at a slight distance from the surface of said bottoms are contemplated and may be powered by known drives and drive assemblies to effect horizontal or other suitable movement for the agitation means.

The vertical column 14 generally includes an upper indirect heating zone 30 and a lower direct heating zone 50.

The upper indirect heating zone 30 should include five or less trays 18; four are shown in the drawing. In the upper indirect heating zone 30 the trays 18 (i.e., pre-desolventizing trays 18A) are steam heated basket type trays which permit solvent vapors to flow around the trays at a low velocity and thereby minimize fines carried out of the column 14 with the solvent vapor. This provides a "clean" solvent vapor and thereby obviates the need for pre-treatment prior to condensing of such solvent vapors.

The lower direct heating zone 50 should include at least two trays 18; five are shown in the drawing. In the lower direct heating zone 50 the trays 18 (i.e., main trays 18B) are hollow staybolt type trays which permit countercurrent steam stripping wherein the solvent vapors from one direct heating zone compartment are vented to the next highest adjacent tray in the column. The bottom most tray of the direct heating zone 50 is a sparge (i.e., steam injection) tray 52 equipped with a variable speed rotary valve 54 to maintain the particulate material 20 at a predetermined level thereupon.

The upper indirect heating zone 30 of the desolventizing apparatus 10, above the upper most compartment, is provided with a dome like cap or top portion 32 having a particulate material inlet 34 and a solvent vapor outlet 36. In this zone 30 of the column 14, the indirect heating is accomplished using steam as by heat exchange through a steam-jacketed wall or via hollow plate style equipment. Preferably the bottoms between the various compartments of this zone 30 consist of two plates enclosing a steam space which is connected to a supply for steam (not shown) so that the interior volume of the double-bottoms can be adjusted to the temperature required in the desolventizing process. It should be understood that each individual bottom may have steam admitted thereto separately or may be connected to a common steam source.

The indirectly heated zone 30 can have one or several trays 18A, but not more than five, and is designed to heat the particulate material 20 to the solvent boiling point and initiate the drying process. All solvent vapors from the indirect heating zone are condensible. "Pre-desolventizing" in the steam heated basket trays 18A reduces the amount of sparge steam required in the direct heating zone 50 so as to reduce the moisture in the particulate material 20 proportionately, thereby reducing the steam duty for the dryer subsequently used to dry the particulate material 20.

In the lower direct heating zone 50 of the desolventizing apparatus 10, live steam, in condensing, gives off its latent heat of vaporization which is imparted to the downwardly cascading solvent containing meal 20. With this approach, almost all remaining solvent is vaporized quickly and exits the column 14 at the solvent vapor outlet 36 to a condenser (not shown) where the substantially dust free solvent is thereafter condensed.

Below the lowermost compartment containing sparge tray 52, column 14 is equipped with an integral air tight flash chamber 56 for enhancing the recovery of solvent vapor within the apparatus to thereby minimize solvent vaporization from the particulate material 20 during drying operations. While a single flash chamber 56 is illustrated, it will be understood that two or more trays are also contemplated. The flash chamber 56 includes a discharge device 58, preferably a rotary pressure lock discharge gate, which may alternately be a screw conveyor or other feed device regulated to discharge the same quantity of meal as is being fed into the top compartment of the column. As a result, a relatively constant volume of meal can be maintained in the desolventizer.

The flash chamber 56 is evacuated using a vapor compressor, preferably a steam ejector or thermocompressor assembly 60. The steam ejector assembly 60 ideally comprises an end suction ejector 62, wherein the flashed solvent enters axially, not perpendicularly, and has only a motive steam nozzle (not shown) impeding the flow of the further recovered solvent through the venturi-shaped diffuser 62A, which converts the velocity energy of the steam into pressure energy for compression of the solvent vapor. The assembly 60 is further provided with clean-outs 64 positioned both up and down stream of the suction end ejector 62.

The thermocompressor effectively pressurizes the solvent vapor withdrawn from the flash chamber 56 to the pressure level required for introduction into the desolventizing apparatus 10, specifically at a location near the top of the direct heating zone 50. As the solvent vapors become superheated upon compression, they thereby possess excess heat energy which is used to heat the partly desolventized particulate material in the upper portions of the desolventizing apparatus.

Preferably, the hot solvent vapors coming from the thermocompressor are introduced into a compartment within the desolventizer upwardly disposed therein but below the uppermost compartment thereof, and preferably at or about the interface of the indirect 30 and direct 50 heating zones of the column 14. The floors (i.e., trays 18) of the compartments 16 above the one into which hot solvent vapors are introduced are preferably porous so that the vapors will pass therethrough and into contact with the meal in the compartment or compartments above the one into which the vapors are introduced. Vaporization of solvent adhering to the particulate material during its passage through the desolventizer will, thereby, be effected by the hot solvent vapors passing therethrough.

In operation, solvent laden meal 20, preferably in flake form, is conveyed by known means and is introduced into the indirect heating zone 30 of the desolventizing apparatus 10 at the meal inlet 34. The meal 20 is received in the steam heated tray 18A of the first (i.e., top) compartment where it is heated and agitated so as to vaporize solvent from the meal 20. The meal 20 progresses downward through the compartments 16 of the indirect heating zone 30, giving up solvent vapor at each stage of the progression. The solvent vapor generally travels around, as opposed to through, the pre-desolventizing trays 18A, in an upward direction, and exits the column 14 at the solvent vapor outlet 36 for subsequent condensing.

The meal 20 next proceeds to the direct heating zone 50 where it is received in spaced apart porous trays 18B. Steam for directly contacting the meal 20 via the trays 18B is introduced into the lower portion of the direct heating zone 50 via a sparge tray 52. As the meal travels downwardly through this zone 50 in a cascading fashion, the sparge steam is condensed upon the meal 20, thereby further liberating solvent from the meal while generally increasing the moisture content of the particulate material. A rotary pressure lock discharge gate 54 transfers the "wet" meal into the underlying integral flash chamber 56 which is maintained at a relatively low pressure compared to the compartment thereabove such that the meal is unable to contain all the heat it originally possessed as heat of fluid, with the residual solvent and steam being spontaneously evaporated. A thermocompressor 60 effectively evacuates the residual solvent vapor from the flash chamber 56 so as to provide superheated solvent vapor for reintroduction into the upper portion of the direct heating zone 30 to reduce total steam consumption and thereby aid in solvent recovery in the desolventizing apparatus.

It will be understood that the material to be processed as hereinabove specified can include all oil bearing materials such as vegetable seeds, gains, nuts and like materials, cotton seed, soya beans, tung nuts, linseed, castor beans, copra, bone meal, meat scraps and the like. The liquid adhering on the liquid extracted material to be treated includes but is not limited to inorganic and organic solvents such as water, aqueous solutions, gasoline, hexane, mixed paraffins, aromatic solvents, alcohols, ketones, aldehydes and other polar and non-polar solvents.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as followed in the true scope of the invention.

What is claimed is:

1. Apparatus for desolventizing particulate material having a solvent carried thereby, comprising:

(a) a particulate material inlet and a particulate material outlet positioned at opposite ends of an apparatus housing;

(b) an upper indirect heating zone below said particulate material inlet and a lower direct heating zone above said particulate material outlet, each of said zones having a plurality of spaced apart horizontal trays for receiving particulate material, said trays defining a vertical series of compartments through which particulate material passes;

(c) means for transferring said particulate material from one of said trays to a vertically downwardly-spaced tray;

(d) means for providing steam to said particulate material indirectly in said indirect heating zone;

(e) means for providing steam tc said particulate material directly in said direct heating zone;

(f) means for agitating said particulate material in each of said trays;

(g) an integral air-tight flash chamber below said means for providing steam to particulate material directly in said direct heating zone so as to enhance solvent recovery via vaporization of residual solvent from steam which condensed and adheres to the particulate material as the particulate material travels through said direct heating zone prior to discharge of said particulate material from said apparatus;

(h) means for delivering, under pressure, the vaporized residual solvent to a predetermined compartment in said direct heating zone of said apparatus to provide heat for desolventizing the particulate material; and (i) a solvent vapor outlet.

2. Apparatus in accordance with claim 1 wherein the trays of said indirect heating zone permit flow of solvent vapor therearound.

3. Apparatus in accordance with claim 2 wherein the trays of said direct heating zone permit a counter-current flow of solvent vapor and steam therethrough.

4. Apparatus in accordance with claim 3 wherein said means for agitating solvent extracted material in each of said trays includes sweep arms driven by a centrally inserted rotary shaft serving to impart horizontal movement to said sweep arms.

5. Apparatus in accordance with claim 4 wherein said sweep arms are positioned about said shaft to move over the bottoms of said compartments of said apparatus.

6. Apparatus in accordance with claim 5 wherein said means for delivering the vaporized residual solvent under pressure to a predetermined compartment in said direct heating zone is a thermocompressor.

7. Apparatus in accordance with claim 6 wherein said thermocompressor comprises an ejector.

* * * * *